(12) United States Patent
Limpert

(10) Patent No.: US 8,083,432 B2
(45) Date of Patent: Dec. 27, 2011

(54) CONNECTION ELEMENT

(75) Inventor: Alexander Limpert, Weikersheim (DE)

(73) Assignee: ITW Automotive Products GmbH & Co., KG, Iserlohn (DE)

( * ) Notice: Subject to any disclaimer, the term of this patent is extended or adjusted under 35 U.S.C. 154(b) by 161 days.

(21) Appl. No.: 12/407,851

(22) Filed: Mar. 20, 2009

(65) Prior Publication Data

US 2009/0245929 A1 Oct. 1, 2009

(30) Foreign Application Priority Data

Apr. 1, 2008 (DE) .......................... 10 2008 016 572

(51) Int. Cl.
*F16L 33/02* (2006.01)
*A44B 17/00* (2006.01)

(52) U.S. Cl. .......................... 403/389; 403/397; 24/336

(58) Field of Classification Search .................... 403/49, 403/78, 164–165, 397–400, 364, 368, 378, 403/385, 389, 390; 24/104, 114.05, 114.4, 24/107, 108, 336, 338, 339; 384/276, 295

See application file for complete search history.

(56) References Cited

U.S. PATENT DOCUMENTS

| | | | | | |
|---|---|---|---|---|---|
| 3,243,206 | A | * | 3/1966 | Samer | 285/154.1 |
| 3,747,166 | A | * | 7/1973 | Eross | 248/75 |
| 4,037,978 | A | * | 7/1977 | Connelly | 403/164 |
| 4,688,961 | A | * | 8/1987 | Shioda et al. | 403/389 |
| 4,817,897 | A | * | 4/1989 | Kreusel | 248/68.1 |
| 5,113,553 | A | * | 5/1992 | Hutchinson | 24/464 |
| 5,167,466 | A | * | 12/1992 | Hsieh | 403/385 |
| 5,259,690 | A | * | 11/1993 | Legge | 403/385 |
| 5,371,991 | A | * | 12/1994 | Bechtel et al. | 52/686 |
| 5,878,546 | A | * | 3/1999 | Westover | 52/719 |
| 7,241,071 | B2 | * | 7/2007 | Carraher et al. | 403/164 |
| 2005/0220532 | A1 | * | 10/2005 | Trotter et al. | 403/165 |

FOREIGN PATENT DOCUMENTS

| | | |
|---|---|---|
| DE | 2345843 A1 | 3/1975 |
| DE | 4228305 A1 | 3/1994 |

* cited by examiner

*Primary Examiner* — Joshua Kennedy
(74) *Attorney, Agent, or Firm* — Lowe Hauptman Ham & Berner LLP

(57) ABSTRACT

A connection element includes first and second retaining elements adapted to be connected to be freely rotated relative to each other about 360°. The first retaining element has a first outer annular portion and a first inner annular portion concentric to the first outer annular portion. The first outer annular portion has an inner locking portion of limited length in the circumferential direction. The second retaining element has a second outer annular portion and a second inner annular portion concentric to the second outer annular portion. The second inner annular portion is matingly accommodated by the first inner annular portion. An annular circumferentially extending locking portion of the second outer annular portion is within the first outer annular portion gripping behind the inner locking portion when the retaining elements are plugged together.

18 Claims, 2 Drawing Sheets

CONNECTION ELEMENT

RELATED APPLICATIONS

The present application is based on, and claims priority from, German Application Number 102008016572.7, filed Apr. 1, 2008, the disclosure of which is hereby incorporated by reference herein in its entirety.

TECHNICAL FIELD

The present invention is related to a connection element.

BACKGROUND

In many cases, there is a need to connect two parts with each other and to permit a rotation of these parts with respect to each other, for instance, retainers for lines or cables must be rotatable in order to permit an adaptation to the course of the line or the cable. Also, two lines or pipes can be connected with each other via a rotational connection.

SUMMARY

The present invention is based on the objective to provide a connection element in which a first and a second retaining element can be connected via a rotary bearing, such that the overall height of the connection element is kept small and the distance of the parts to be connected, lines for instance, should be minimum.

In the connection element according to the present invention, a first annular rotary bearing portion has a first outer annular portion and a first inner annular portion concentric to the outer annular portion, the first outer annular portion at the inner circumference having a first locking portion of limited length in the circumferential direction. A second annular rotary bearing portion has a second outer annular portion and a second inner annular portion concentric to the outer annular portion, the second inner annular portion being matingly accommodated by the first inner annular portion, an annular circumferentially extending second locking portion of the second outer annular portion within the first outer annular portion gripping behind the first locking portion when the rotary bearing portions are plugged together substantially in an approximately parallel position relative to each other.

According to one embodiment of the present invention, the second locking portion is conical with a conical surface tapering towards the plugging direction and an annular circumferentially extending shoulder, behind which the first locking portion grips when the rotational bearing portions are plugged together. According to a further embodiment of the present invention, the shoulder joins preferably to a cylindrical annular surface.

According to another embodiment of the present invention, a cylindrical surface is provided at the inner circumference of the first outer annular portion, the diameter thereof being equal to or somewhat larger than the outer diameter of the second locking portion. The first inner annular surface can be accommodated matingly in an annular intermediate space between the second inner annular portion and the second outer annular portion.

The tractive force which acts in the direction away from the rotary bearing portions is taken up by the locking portions. Tilting of the rotary bearing portions with respect to each other is prevented by the annular portions, which engage matingly one into the other and by doing so form not only a guiding in the perimeter direction, but take up transversal forces also. Nevertheless, the rotary bearing portions can be brought out of engagement by detaching the annular portions from each other.

The connection element according to the present invention has several advantages. The annular rotary bearing has a small overall height and through this it permits a small distance of the assembly parts which are to be connected by the retaining elements, for instance a small axis distance of the lines which are to be accommodated. The connection element according to the present invention is ruggedly executed and is adapted to be manufactured in a safe process. The installation of the two individual parts of the connection element of the present invention can be performed in a simple manner. The rotary bearing portions can be turned against each other easily and with only small frictional losses. It is possible to mount and to dismount the rotary bearing portions several times without compromising the demands which have to be made for such a connection element.

In order to achieve an easier moulding and demoulding of the undercut with respect to the first locking portion, one embodiment of the present invention provides that the first outer annular portion has openings on the side opposite to the first locking portion, through which the locking portion can be formed in the injection moulding die and the corresponding rotary bearing portion can be removed from the die.

Preferably, the connection element of the present invention serves for the accommodation of pipes, lines and the like.

BRIEF DESCRIPTION OF THE DRAWINGS

An example of the realisation of the present invention will be explained in more detail by means of drawings in the following.

DETAILED DESCRIPTION

Figure 1:
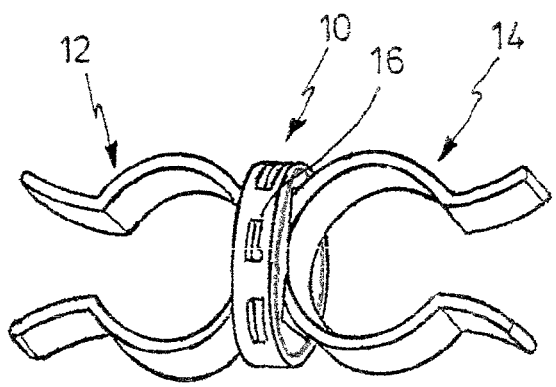
FIG. 1 shows a connection element of the present invention in the assembled condition, in a perspective view.

In FIG. 1, a connection element 10 can be recognised with two clip-like retaining elements 12, 14 which are adapted to accommodate pipes or lines. The retaining elements 12, 14 are rotatably connected with each other via a rotary bearing 16. The retaining elements 12, 14 can be rotated about 360° or about a multiple of 360°.

Figure 2:
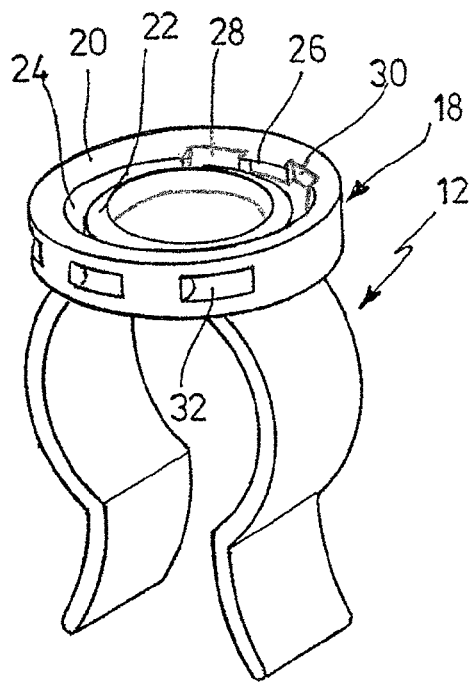
FIG. 2 shows a first retaining element with a first rotary bearing portion for the connection element of FIG. 1 in a perspective view.
Figure 3:
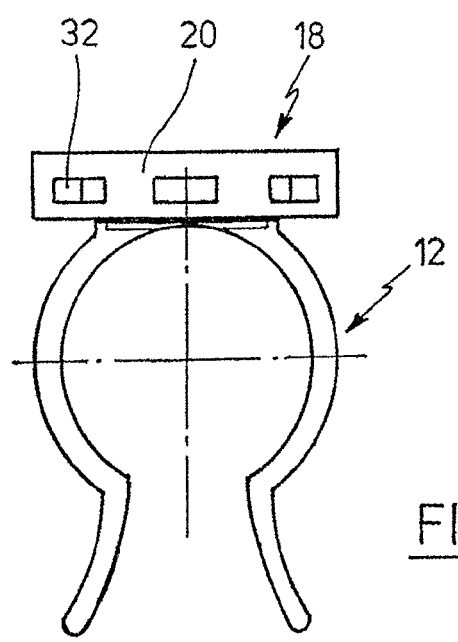
FIG. 3 shows the side view of the part of FIG. 2
Figure 4:
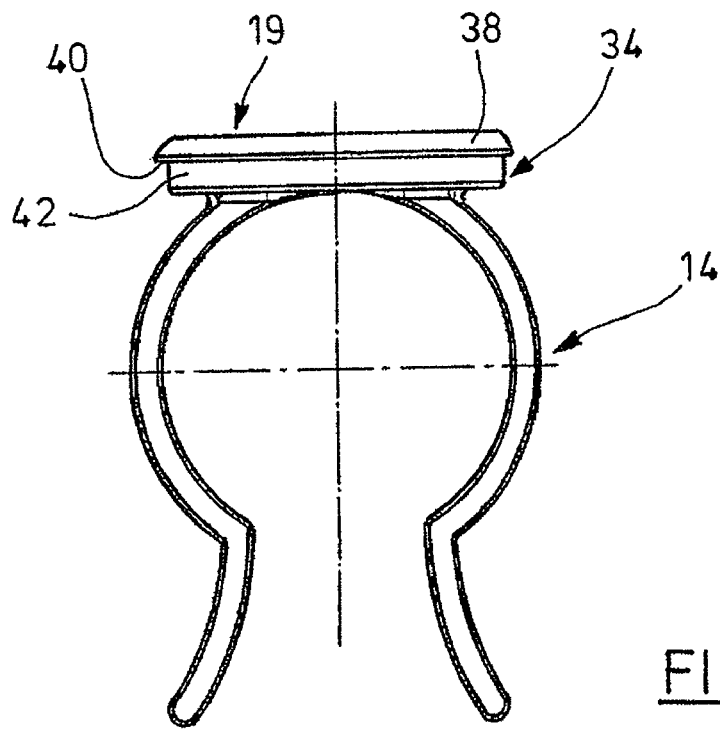
FIG. 4 shows the side view of the second retaining element with a second rotary bearing portion of the connection element of FIG. 1.

In FIGS. 2 and 3, the retaining element 12 with a first rotary bearing portion 18 is depicted. The rotary bearing portion 18 has an outer annular portion 20 and an inner annular portion 22. The annular portion 20 has a circumferentially extending cylinder surface 24 on its inner perimeter, and at one position a locking projection 26 with undercut. On both sides of the locking projection 26 recesses 28, 30 can be recognised. They serve to mould the locking portion 26 in the manufacture of the retaining element 12 in an injection moulding mould. For this purpose, three openings 32 are formed in the annular portion 20, diametrically opposite to the locking portion 26 or to the recesses 28, 30, respectively.

Figure 5:
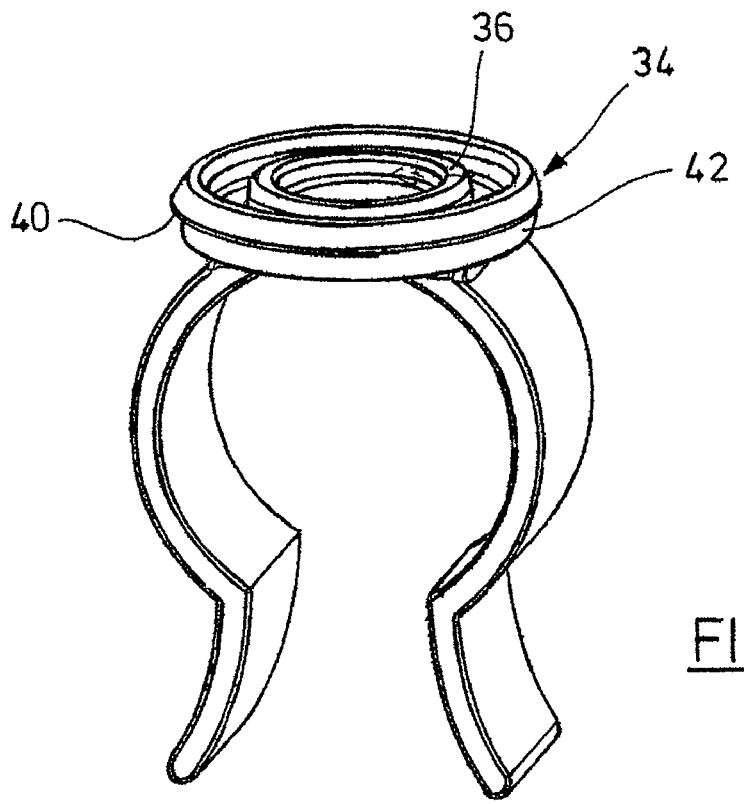
FIG. 5 shows the part of FIG. 4 skew from the topside, in a perspective view.

The second retaining element 14 has a second outer annular portion 34 and an inner annular portion 36 concentric to the outer annular portion 34 (FIG. 5). The outer annular portion 34 has an outer conical annular surface 38, which tapers towards the fine end. On the opposing side, the conical portion 38 has an annular shoulder 40. A cylindrical portion 42 joins to the annular shoulder. When the rotary bearing portions of the retaining elements 12 and 14 are plugged into each other, the rotary bearing portions being arranged in parallel to each other in this, the shoulder 40 clicks behind the locking projection 26. The inner annular portion 36 engages into the inner annular portion 22 of the rotary bearing portion 18, the engaging surfaces being mating in doing so, so that a lateral or tilting movement is prevented. With its broadest portion, the conical surface 38 bears against the cylindrical surface 24 of the first annular portion 20. In this, the outer annular portion 34 of the rotary bearing portion of the retaining element 12 engages matingly into the intermediate space between the outer annular portion 20 and the inner annular portion 22 of the rotary bearing portion 18. Thus, a stable rotary bearing secured against tilting has been formed, which generates little friction in a twisting of the rotary bearing portions with respect to each other. A tractive force which wants to pull the two retaining elements 12, 14 away from each other is taken up by the shoulder 40 of the rotary bearing portion 19 and by the locking projection 26.

As can be recognised, the rotary bearing according to FIG. 1 can be executed to be very narrow, through which the axes of the lines which are accommodated by the retaining elements lie close to each other.

The invention claimed is:

1. A connection element, comprising:
   a first retaining element having a first annular rotary bearing portion, and
   a second retaining element having a second annular rotary bearing portion engageable with the first annular rotary bearing portion to define a rotary bearing for connecting the first and second retaining elements such that the retaining elements are freely rotatable relative to each other over 360 degrees about a rotation axis,
   wherein
   the first annular rotary bearing portion has a first outer annular portion and a first inner annular portion concentric to the first outer annular portion,
   the first outer annular portion, at an inner circumference thereof, has a first locking portion extending circumferentially for less than 360 degrees,
   the second annular rotary bearing portion has a second outer annular portion and a second inner annular portion concentric to the second outer annular portion,
   the second inner annular portion is matingly receivable in the first inner annular portion,
   the second outer annular portion has a second, circumferentially extending annular locking portion,
   when the rotary bearing portions are plugged together in a plugging direction along said rotation axis, the second locking portion is received within the first outer annular portion and gripping behind the first locking portion for securing against separation of the rotary bearing portions in a direction opposite to the plugging direction,
   at least one of the first and second retaining elements further includes, on a side that faces away from the other retaining element when the rotary bearing portions are plugged together, a holding portion having therethrough a channel, and
   said channel has an axial direction transverse to the rotation axis of the rotary bearing and is arranged for holding therein at least one member elongated in the axial direction of the channel.

2. The connection element of claim 1, wherein the second locking portion has a conical surface tapering towards the plugging direction, and includes an annular circumferentially extending shoulder defining said second locking portion.

3. The connection element of claim 2, wherein the second outer annular portion further has a cylindrical annular surface connected to the conical surface by the shoulder.

4. The connection element of claim 1, wherein the inner circumference of the first outer annular portion has a cylindrical surface of a diameter being equal to or approximately larger than an outer diameter of the second locking portion.

5. The connection element of claim 1, wherein, when the rotary bearing portions are plugged together, the first inner annular portion is radially accommodated matingly in an annular intermediate space between the second inner annular portion and the second outer annular portion.

6. The connection element of claim 1, wherein, when the rotary bearing portions are plugged together, the second outer annular portion is radially accommodated in an annular intermediate space between the first inner annular portion and the first outer annular portion.

7. The connection element of claim 1, wherein the first outer annular portion has an opening approximately diametrically opposite to the locking portion for the removal of the first rotary bearing portion from a die.

8. A connection element, comprising:
   a first retaining element having a first annular rotary bearing portion, and
   a second retaining element having a second annular rotary bearing portion engageable with the first annular rotary bearing portion to define a rotary bearing for connecting the first and second retaining elements such that the retaining elements are freely rotatable relative to each other over 360 degrees about a rotation axis,
   wherein
   the first annular rotary bearing portion has a first outer annular portion and a first inner annular portion concentric to the first outer annular portion,
   the first outer annular portion, at an inner circumference thereof, has a first locking portion extending circumferentially for less than 360 degrees,
   the second annular rotary bearing portion has a second outer annular portion and a second inner annular portion concentric to the second outer annular portion,
   the second inner annular portion is matingly receivable in the first inner annular portion,
   the second outer annular portion has a second, circumferentially extending annular locking portion,
   when the rotary bearing portions are plugged together in a plugging direction along said rotation axis, the second locking portion is received within the first outer annular portion and gripping behind the first locking portion for securing against separation of the rotary bearing portions in a direction opposite to the plugging direction, and
   at least one of the first and second retaining elements further includes, on a side that faces away from the other retaining element when the rotary bearing portions are plugged together, a pair of legs defining therebetween a channel for holding at least one member elongated in an axial direction of the channel.

9. The connection element of claim 8, wherein said legs have proximal portions attached to the respective rotary bearing portion, middle portions defining therebetween said channel, and distal portions flaring away from each other.

10. A connection element, comprising:
a first retaining element having a first annular rotary bearing portion, and
a second retaining element having a second annular rotary bearing portion engageable with the first annular rotary bearing portion for rotatably connecting the first and second retaining elements,
wherein
the first annular rotary bearing portion has a first outer annular portion, and a first inner annular portion concentric to the first outer annular portion,
the first outer annular portion, at an inner circumference thereof, has a first locking portion,
the second annular rotary bearing portion has a second outer annular portion, and a second inner annular portion concentric to the second outer annular portion,
the second outer annular portion has a second locking portion engageable with the first locking portion,
the rotary bearing portions have an assembled state in which the rotary bearing portions are plugged together with the second locking portion engages the first locking portion for securing against separation of the rotary bearing portions,
in said assembled state, the first and second retaining elements are rotatable relative to each about a rotation axis, the second inner annular portion is matingly received in the first inner annular portion, and the second outer annular portion is radially positioned between the first inner annular portion and the first outer annular portion,
at least one of the first and second retaining elements further includes, on a side that faces away from the other retaining element in the assembled state, a pair of legs defining therebetween a channel for holding at least one member elongated in an axial direction of the channel, and
said axial direction of the channel is transverse to the rotation axis.

11. The connection element of claim 10, wherein the second outer annular portion has an annular circumferentially extending shoulder defining said second locking portion.

12. The connection element of claim 11, wherein the second outer annular portion further has
a conical surface tapering in a plugging direction in which the rotary bearing portions are to be plugged together, and
a cylindrical annular surface connected to the conical surface by the shoulder.

13. The connection element of claim 10, wherein the inner circumference of the first outer annular portion has a cylindrical surface of a diameter equal to or approximately larger than an outer diameter of the second locking portion.

14. The connection element of claim 10, wherein, in said assembled state, the first inner annular portion is radially, matingly received between the second inner annular portion and the second outer annular portion.

15. The connection element of claim 10, wherein the first outer annular portion, at the inner circumference thereof, further has a pair of recesses on opposite side of the first locking portion.

16. The connection element of claim 15, wherein the first outer annular portion has openings approximately diametrically opposite to the locking portion and the recesses, respectively, for the removal of the first rotary bearing portion from a mold.

17. The connection element of claim 10, wherein said legs have proximal portions attached to the respective rotary bearing portion, middle portions curved away from each other and defining therebetween said channel, and distal portions flaring away from each other.

18. A connection element, comprising:
a first retaining element having a first annular rotary bearing portion, and
a second retaining element having a second annular rotary bearing portion engageable with the first annular rotary bearing portion for rotatably connecting the first and second retaining elements,
wherein
the first annular rotary bearing portion has a first outer annular portion, and a first inner annular portion concentric to the first outer annular portion,
the first outer annular portion, at an inner circumference thereof, has a first locking portion,
the second annular rotary bearing portion has a second outer annular portion, and a second inner annular portion concentric to the second outer annular portion,
the second outer annular portion has a second locking portion engageable with the first locking portion,
the rotary bearing portions have an assembled state in which the rotary bearing portions are plugged together with the second locking portion engages the first locking portion for securing against separation of the rotary bearing portions,
in said assembled state, the first and second retaining elements are rotatable relative to each about a rotation axis, the second inner annular portion is matingly received in the first inner annular portion, and the second outer annular portion is radially positioned between the first inner annular portion and the first outer annular portion,
at least one of the first and second retaining elements further includes, on a side that faces away from the other retaining element in the assembled state, a holding portion having therethrough a channel; and
said channel has an axial direction perpendicular to the rotation axis and is arranged for holding therein at least one member elongated in the axial direction of the channel.

* * * * *